United States Patent
Paatelma et al.

(10) Patent No.: US 7,302,235 B2
(45) Date of Patent: Nov. 27, 2007

(54) SYNCHRONISER

(75) Inventors: Risto Paatelma, Oulu (FI); Juha Kuronen, Oulu (FI); Heikki Berg, Oulu (FI)

(73) Assignee: Nokia Corporation, Espoo (FI)

(*) Notice: Subject to any disclaimer, the term of this patent is extended or adjusted under 35 U.S.C. 154(b) by 1026 days.

(21) Appl. No.: 10/036,046

(22) Filed: Oct. 26, 2001

(65) Prior Publication Data

US 2002/0106992 A1 Aug. 8, 2002

(30) Foreign Application Priority Data

Oct. 27, 2000 (GB) ................................ 0026361.6

(51) Int. Cl.
*H04B 1/00* (2006.01)

(52) U.S. Cl. .......................... 455/68; 455/112; 455/113

(58) Field of Classification Search ................ 455/502, 455/226.1, 259, 260, 293, 67.11, 67.13; 375/221, 375/327, 328, 355, 376
See application file for complete search history.

(56) References Cited

U.S. PATENT DOCUMENTS

| | | | |
|---|---|---|---|
| 4,100,531 A * | 7/1978 | Fletcher et al. ............. 375/225 |
| 5,245,611 A * | 9/1993 | Ling et al. ................... 370/347 |
| 5,272,446 A | 12/1993 | Chalmers et al. |
| 5,406,552 A * | 4/1995 | Long et al. .................. 370/291 |
| 5,440,587 A | 8/1995 | Ishikawa et al. |
| 5,579,345 A * | 11/1996 | Kroeger et al. ............. 375/344 |
| 5,757,857 A * | 5/1998 | Buchwald .................... 375/271 |
| 5,768,323 A * | 6/1998 | Kroeger et al. ............. 375/355 |
| 5,910,753 A * | 6/1999 | Bogdan ....................... 331/17 |
| 6,122,329 A * | 9/2000 | Zai et al. ..................... 375/329 |
| 6,320,529 B1* | 11/2001 | Yasuda ........................ 341/155 |
| 6,487,252 B1* | 11/2002 | Kleider et al. ............. 375/260 |
| 6,522,696 B1* | 2/2003 | Mobin et al. ............... 375/262 |
| 6,625,231 B1* | 9/2003 | Shen ........................... 375/316 |

FOREIGN PATENT DOCUMENTS

| | | |
|---|---|---|
| EP | 0 689 324 A2 | 12/1995 |
| JP | 64-054944 | 3/1989 |

* cited by examiner

*Primary Examiner*—Temica Beamer
(74) *Attorney, Agent, or Firm*—Harrington & Smith, PC

(57) ABSTRACT

A synchroniser for use in a receiver which receives signals, wherein the synchronizer provides a digital control signal, the control signal defining a plurality of different levels; controls the level provided by successive ones of the control signals, successive ones of the control signal defining different values; and estimates the difference between the levels of successive ones of the control signals.

22 Claims, 3 Drawing Sheets

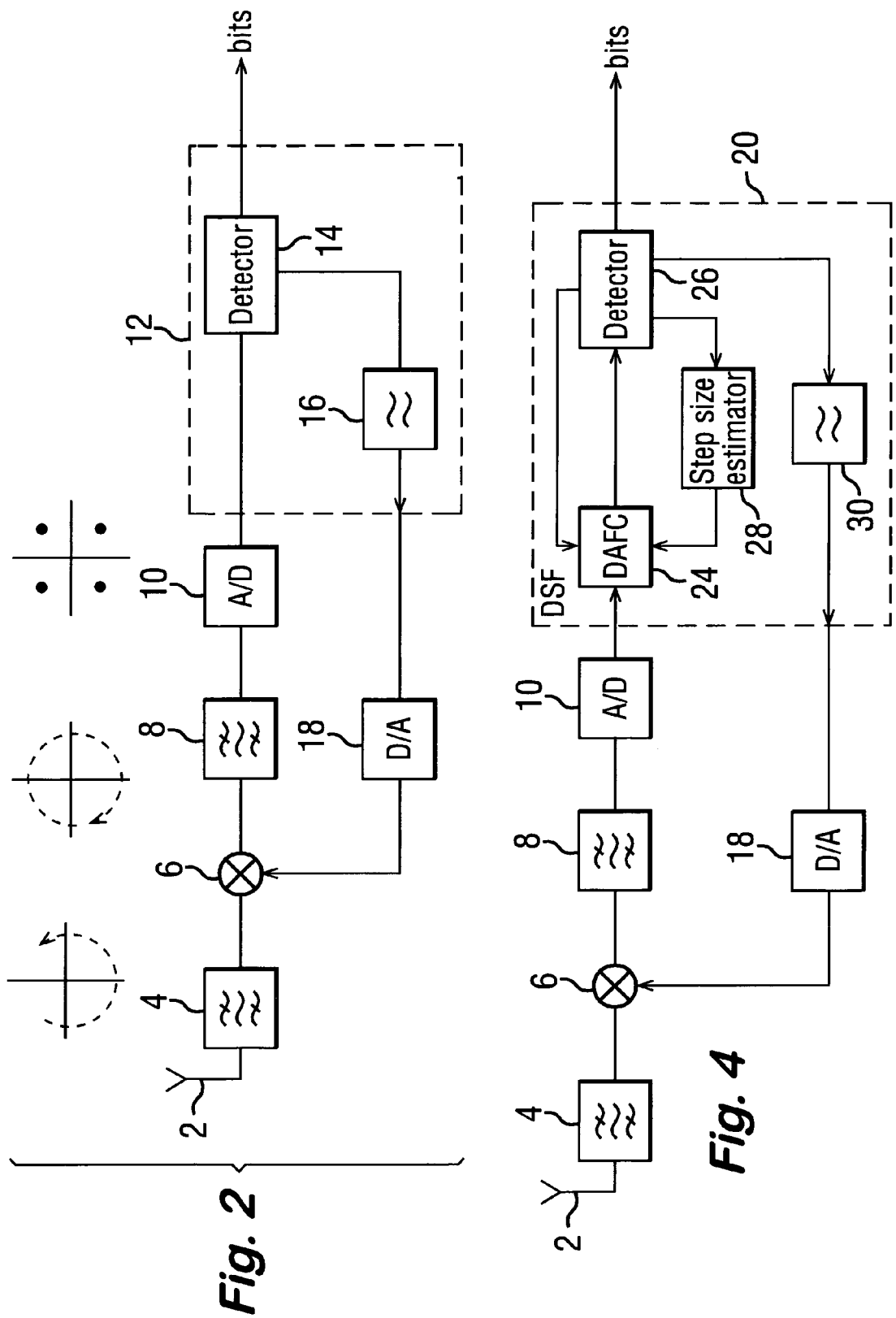

SYNCHRONISER

FIELD OF THE INVENTION

The present invention relates to a synchroniser and in particular but not exclusively to a synchroniser for use in a wireless receiver in a telecommunications system.

BACKGROUND OF THE INVENTION

Wireless cellular telecommunication networks are known. The area covered by the network is divided into a plurality of cells. Each cell is served by a base station which is arranged to receive signals and transmit signals to mobile stations located in the cell associated with the respective base station.

In mobile stations, the receiver is arranged to perform synchronisation with respect to the received signals. This synchronisation can be divided into two stages. Initially the signal is acquired during the acquisition phase and the initial synchronisation is performed. In the next stage, the signal is tracked. In particular, changes in the radio channel and the receiver are tracked so that synchronisation is maintained.

The following is an example of frequency synchronization. For timing, a similar arrangement can be used.

In the known receivers, this synchronisation is done for example for frequency and timing. Reference is made to FIG. 2 which shows a block diagram of a known receiver. The signals are initially received by an antenna 2. The output of the antenna 2 is input to a first bandpass filter 4 which filters out the unwanted signals. Typically, the first bandpass filter 4 will allow a relatively wide range of frequencies therethrough. The output of the first bandpass filter 4 is output to a mixer 6. This mixer 6 downconverts the received radio frequency signals to a baseband frequency. This is achieved by mixing the received signal with an appropriate mixing frequency. This will be described in more detail later.

The output of the mixer 6 is input to a second bandpass filter 8 which is much narrower than the first bandpass filter. This second filter 8 is arranged to remove unwanted signals falling outside the bandwidth of the second filter. The output of the second filter 8 is input to an analogue to digital converter 10 which converts the signals from analogue to digital form. The output of the converter is output to a digital processor 12. The digital processor 12 has a detector 14 which estimates the frequency and generates a correction factor.

The correction factor is output to a third filter 16 which filters the correction value. It should be appreciated that the correction value is a digital value. The filtered corrected value is output by the digital processor 12 to a digital to analogue converter 18. The converter 12 converts the digital correction value to an analogue value. This analogue value is used to control the mixer 6 and in particular the frequency with which the output of the first bandpass filter 4 is mixed. This controls the frequency of the signals which are output by the mixer 6.

As can be seen, the synchronising elements include digital elements and analogue elements and as such are sometimes referred to as hybrid synchronisers. This can lead to problems. In particular the correction value is determined in the digital domain but the correction is done in the analogue domain. The conversion of the correction value from the digital value to the analogue value has problems associated therewith. In particular, the digital to analogue converter is not linear so the angular coefficient is not constant. Additionally, the analogue correction will suffer inaccuracies due to temperature changes, aging and operating conditions. For example the correction will vary depending on the frequency. Thus the correction made by the analogue elements will not be particularly accurate. This may mean that the variance caused by the correction is greater than the variance in the parameter estimation done in the digital processor.

A further problem is caused by the factor that the digital value is converted into an analogue value. The number of bits of the correction value provides a limitation on the accuracy of the correction. If the digital to analogue converter is able to deal with a relatively long word, it will be relatively expensive. If on the other hand the digital to analogue converter is able only to deal with relatively short words, the correction can only be done by limited step sizes. This problem is referred to as quantization noise.

Reference is made to FIG. 3 which shows a graph of the control value as a function the control step in a non-linear system. If this function shown in FIG. 3 is well known and the minimum step is small enough, it is possible to calculate the control word so that precise control can be achieved. in practice, this is difficult to do in that this function is dependent on temperature, ageing and operating conditions. This means that even if the receiver is tuned in the factory to achieve optimum performance, this optimum performance will not be achieved once the receiver is actually used. Additionally, as mentioned previously, the minimum step size is preferred to be relatively large to minimise the costs of the digital to analogue converter.

It has been proposed to provide two loops to provide control. One loop incorporates a digital automatic frequency control which provides a fine correction. The other loop provides a rough correction. The two loops are independently controlled. The first loop is faster than the second loop. However this arrangement also has problems. The first loop can not react fast enough and hence there is a transient when second loop is controlled. For example if the rough control loop has a 500 Hz step and the fine control loop has a 100 Hz control loop problems arise. The first loop is unable to provide a reading if the error is greater than 100 Hz. Additionally the problem of the unknown step size means that the digital correction is not able to work correctly when the analogue control word changes. The problem is that while the frequency is estimated in the decision directed loop which requires reliable decisions, only rather small quantization steps are allowed. Otherwise the frequency error would be so large that the frequency estimation could fail in especially poor conditions and the synchroniser could become unstable.

An additional problem of acquisition is that this should be done quickly. This usually means that from time to time large corrections have to be made. This causes additional problems to those which have already been discussed.

In summary, the large unknown time varying step size in the analogue correction causes a number of difficulties, as discussed above.

SUMMARY OF THE INVENTION

It is an aim of embodiments of the present invention to address one or more of the problems with the known arrangements. Embodiments of the present invention aim to provide an arrangement which provides good synchronisation even if the step size is unknown, variable and/or relatively large.

According to a first aspect of the present invention, there is provided a synchroniser for use in a receiver which receives signals, said synchroniser comprising means for providing a digital control signal, said control signal defining a plurality of different levels; means for controlling the level provided by successive ones of said control signals, successive ones of said control signal defining different values; and means for estimating the difference between the levels of successive ones of said control signals.

Thus in embodiments of the present invention, the actual analogue step size may be tracked and the remaining synchronisation error may be digitally corrected.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For a better understanding of the present invention and as to how the same may be carried into effect, reference will now be made by way of example to the accompanying drawings in which:

FIG. 2 shows a block diagram of a known receiver;

FIG. 4 shows a block diagram of a processor embodying the present invention.

DETAILED DESCRIPTION OF THE INVENTION

Figure 1:
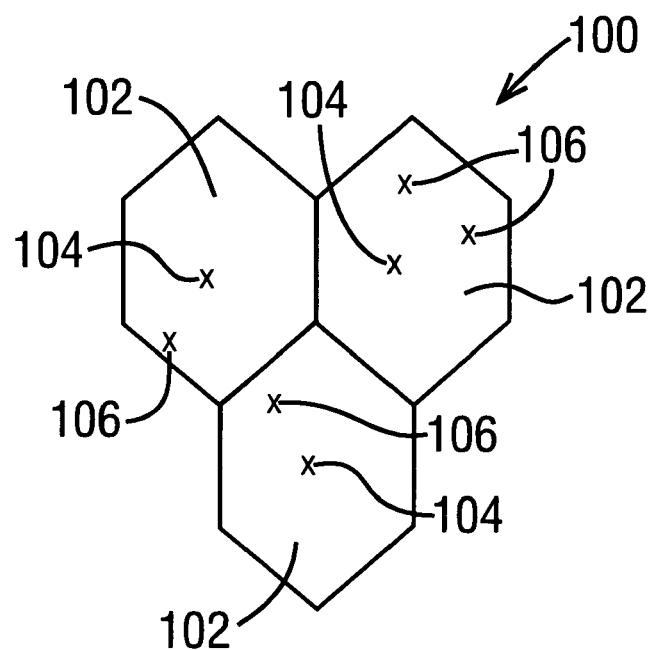
FIG. 1 is a schematic view of a wireless cellular network in which embodiments of the present invention may be used.
Figure 3:
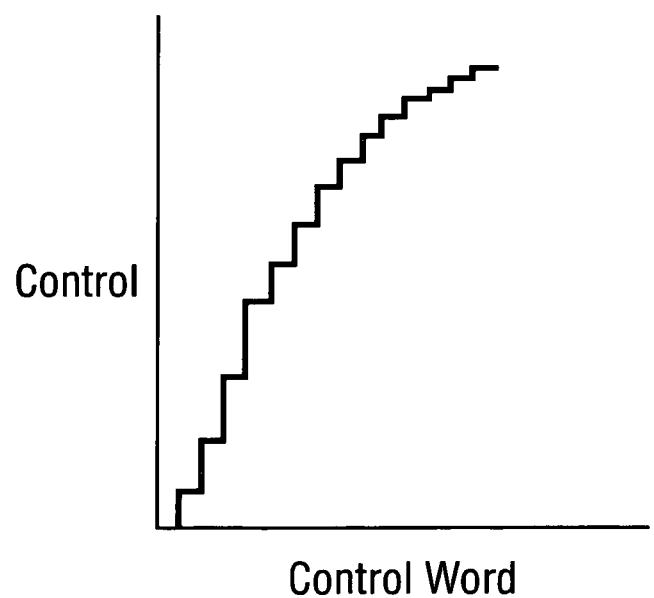
FIG. 3 shows a graph of the control value as a function of the control word.

Reference will be made to FIG. 1 which shows a schematic view of a wireless cellular network in which embodiments may be used. The area covered by the network 100 is divided into a plurality of cells 102. Each cell 102 is served by a base station 104 which is arranged to transmit signals to and to receive signals from mobile stations 106 in the cell associated with the respective base station 104.

In the embodiments described, the mobile stations and the base stations use a time division multiple access technique and a frequency division multiple access technique. This means that several different frequencies are used in a network and a mobile station is allocated one of these frequencies to communicate with a base station. Likewise the base station will be allocated a frequency to communicate with the mobile station. The frequencies allocated may be the same or different. Each frequency is divided into a plurality of time slots and a mobile station will be allocated a given slot for communication, Likewise the base station will be allocated a given slot to communicate with a given mobile station. The network may be in accordance with the GSM (global system for mobile communications) standard or any other appropriate standard.

The tracking mode of embodiments of the invention will now be described. As the frequency with which the base station transmits the signals changes due to its frequency draft, jitter and so on, the mobile station needs to be able to track these changes. Additionally, the path taken by signals between the base station and the mobile station can change the frequency of the signal as it travels along that path. This effect is known as Doppler shift. Finally the mobile station has it's own frequency inaccuracies. These changes also need to be tracked.

Reference will now be made to FIG. 4 which shows an embodiment of the present invention. Those elements which are the same as in FIG. 2 are marked with the same reference numerals. FIG. 4 shows a receiver in a mobile station.

Signals transmitted to the mobile station from the base station are received by the antenna 2. The received signals are output to a first bandpass filter 4 which has a relatively wide bandwidth. All of the signals of interest will fall in the bandwidth of the first filter 4. The filtered output is provided to a mixer 6. The filtered output is mixed with a frequency which causes the output to be at or near the base band frequency. The frequency with which the output from the first bandpass filter 4 is mixed is controlled by the output of a digital to analogue converter 18 as will be described in more detail later.

The output of the mixer 6 is input to a second bandpass filter 8. The second band pass filter has a narrower bandwidth than the first band pass filter and removes undesired signals including any undesired signals introduced by the mixer 6. The output of the second filter 8 is input to a digital signal processor DSP 20. The digital signal processor operates in a different way to that of the known receiver.

The embodiment of the present invention provides analogue control to provide a rough correction. The mixer 6 achieves this under the control of the output of the digital to analogue converter 18. Digital control for a fine correction, the frequency error and step size estimation is provided by the digital signal processor 20. The digital signal processor 20 in conjunction with the digital to analogue converter (which provides the control signal for the analogue control, that is the mixer 6) provides a control function.

For example, when the receiver is first made, each step represents a change of 20 Hz. However, due to changes in ageing, temperature or operational conditions, each step can represent a change of more or less than 50 Hz. Embodiments of the invention allow the effect of the control words to be tracked even if the frequency is changing slowly. The second band pass filter may have a tolerance of +/−100 Hz.

The digital signal processor comprises a digital automatic frequency control DAFC unit 24. The DAFC 24 is arranged to perform a more accurate correction so that a zero or as close as possible to zero error is achieved. The digital correction is controlled by a step size estimation. Thus while the control word is changed, the digital control can compensate for the effect of the analogue control for which the step size is estimated and hence known. This is the case, even if the step size changes slowly with time. The DAFC also generates the word which is used to control the digital to analogue converter.

An example of how the step estimation is used will now be described. For example the step size is 50 Hz. The analogue control is set to some value and to achieve a zero error, the digital control is set to 20 Hz in this slot. For the next slot, the analogue control is changed by one step. It is thus known that the frequency will charge by 50 Hz. Hence the digital correction must be changed to −30 Hz to achieve a zero error. The analogue part is thus controlled for one step and due to the step size estimate, it is known by how much the frequency will be changed.

The digital automatic frequency control DAFC unit 24 has an output connected to a detector 26. The output of the detector 26 is connected to a step size estimator 28. The output of the step size estimator 28 is connected to the DAFC 24.

The step size estimator 28 is arranged to estimate the actual step size which is provided by the digital to analogue converter. This allows the effects of temperature, aging etc to be compensated. Reference will be made to FIG. 5 which shows the principles used. The control word provided by the digital signal processor is changed every time slot even if it is not required. The control words selected may therefore represent the best value and the second best value. If the best value for a given time slot is the same as the best value of the previous time slot the next best value is used. If not the best value is used. In this way the effect of the step can be measured and if it changes, it can be taken into account.

Figure 5D:
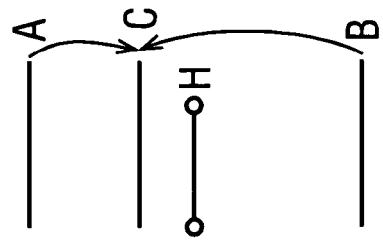
FIGS. 5A-5D shows a block diagram illustrating the principles of the step estimator of FIG. 4.
Figure 5C:
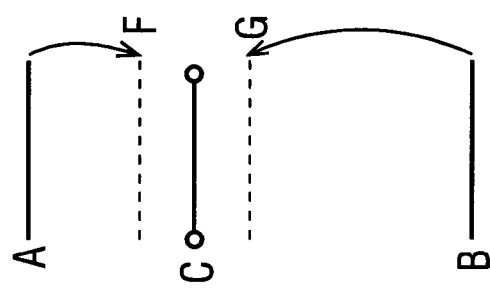
Figure 5B:
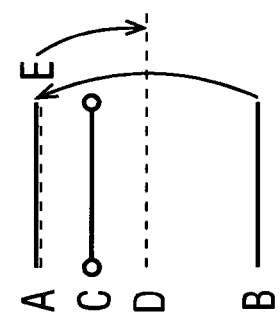
Figure 5A:
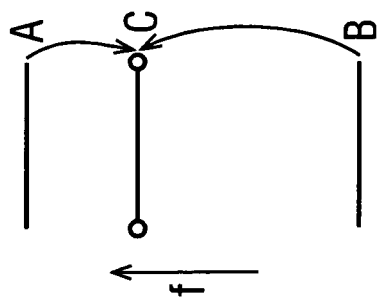

Reference is made first to FIG. 5a. The first level A represents the best value frequency selected as the control word to control the mixer 6. The second level B represents the second best frequency value used in the next time slot to control the mixer 6. Level C represents the actual frequency. Using two time slots, it is possible for the step size estimator to estimate the size of the step between levels A and B. In the first time slot, the step size estimator 28 estimates the step size between level A and level C. In the next time slot, the step size estimator estimates the step size between level B and level C. These two estimates are summed to give an estimate of the step size. This information is then used by the DAFC 24 when determining the fine error correction for the next time slot.

Reference is made to FIG. 5b which shows the results where the step size has got smaller. As compared to the situation illustrated in FIG. 5a the difference between level A and level C has decreased and the difference between level B and C has also decreased. If the step size had stayed the same, the actual frequency relative to level A would be expected at level D. Likewise if the step size had stayed the same, the actual frequency relative to level B would be expected at level E. As can be seen from FIG. 5b, the level E is "higher" than level D. Using this information, it can be determined by the step size estimator that the step size has got smaller.

Reference is made to FIG. 5c which shows the results where the step size has got bigger. As compared to the situation illustrated in FIG. 5a the difference between level A and level C has increased and the difference between level B and C has also increased. If the step size had stayed the same, the actual frequency relative to level A would be expected at level F. Likewise if the step size had stayed the same, the actual frequency relative to level B would be expected at level G. As can be seen from FIG. 5c, the level F is "higher" than level G. Using this information, it can be determined by the step size estimator that the step size has got larger.

It is assumed that the actual frequency in the examples of FIGS. 5b and 5c has not changed.

Reference is made to FIG. 5d which shows the results where the step size has stayed the same but that the actual frequency has changed. As compared to the situation illustrated in FIG. 5a the difference between level A and level H representing the actual frequency has increased and the difference between level B and level H has decreased. This means that the actual frequency of a previous slot, level C is either higher or lower than the actual frequency in the current slot. In the case of a decreasing frequency, this would result in two "positive" errors and in the case of an increasing frequency, this would result in two "negative errors". Using this information, it can be determined by the step size estimator that the step size has stayed the same and that the actual frequency has changed.

The output of the detector 26 is connected to the input of a filter 30. The detector 26 measures the frequency error. The filter 30 filters the digital word output by the detector 26. The filtered digital word is output from the digital signal processor 20 and input to the digital to analogue converter 18 which converts the digital control word into an analogue control signal which is used to control the frequency with which the input signal is measured. As mentioned above, in each successive step, the frequency which is mixed with the received signal is also changed. The step sizes are relatively large, without the digital correction. However the step sizes are such that any desired signal will be able to pass through the second bandpass filter 8, A correction is provided by the analogue control, that is by the mixer 6 operating under the control of the control word generated by the digital signal processor. The purpose of this correction is to ensure that the signal output by the mixer passes through the second bandpass filter.

The use of hybrid synchronisation is advantageous particular where automatic frequency control is used. The frequency of the signal output by the mixer 6 has to be controlled so that it is able to pass through the second bandpass filter 8. It should be appreciated that in alternative embodiments of the invention, other methods of control other than automatic frequency control may be used.

In summary, analogue correction is provided for a rough correction. Digital correction is provided for a fine correction. The frequency error is estimated by the detector. The actual step size used in the analogue correction is estimated by the step size estimator. The DAFC also controls the division of the correction between the analogue and digital parts. The analogue control signal is changed each slot so that the effect of one step can be measured. The digital control compensates for the effect of this known change in the frequency error while the step size estimation is valid. The step size and frequency error estimations are updated based on the frequency error changes.

Embodiments of the present invention may provided accurate synchronisation even if the step size is relatively (because the digital to analogue converter has a small word length), the step size is unknown and/or the step size is variable (linear or non linear).

The acquisition mode will now be described.

Thus, in the tracking mode, the analogue control is changed slot by slot. The frequency error is measured and the size estimation is updated. The remaining error is then removed digitally.

The acquisition mode will now be described.

The initial acquisition of the signal should be performed as quickly as possible. In hybrid systems, fast synchronisation times usually mean that large corrections need to be made from time to time. To take into account the non linearity and time variant changes, the angular coefficient of the digital to analogue converter is adaptively estimated based on two consecutive error estimates. By using two consecutive error estimates the non linearity in the digital to analogue converters can be taken into account and compensated. Using adaptive control step estimation as will described in more detail later, the synchronisation time can be decreased because the very large corrections become more accurate. In particular, the effect of temperature changes, component inaccuracies and ageing on the digital to analogue converter can be compensated. Additionally if the angular coefficients of the digital to analogue converter are tuned, these values can be updated based on the measurement using the adaptive control structure which will now be described.

The steps which are performed will now be described:

In the first step, the first adjustment is based on the fixed or tuned angular coefficient. The initial control word or correction value can be expressed as:

$$C_0 = e_0/\forall_0$$

where $e_0$ is the synchronisation parameter error in the first measurement and $\forall_0$ is the initial guess for the angular coefficient of the digital to analogue converter.

In the next slot n or step, a new synchronisation error $e_n$ is calculated and a new angular coefficient $\forall_n$ is calculated.

$$\forall_n = (e_{n-1} - e_n)/C_{n-1}$$

The next control word is thus:

$$C_n = e_n/\forall_n$$

These steps are repeated until synchronisation is achieved.

In embodiments of the present invention, the fixed or tuned angular coefficient can be updated so that the next time acquisition occurs, the last estimate of the angular coefficient can be used as the initial value in the first step. In some embodiments of the invention where the digital to analogue converter is very non linear, the receiver can have a table of values for the fixed or tuned angular coefficient values for example as a function of synchronisation error. The most appropriate fixed or tuned angular coefficient value can be selected in the first stage as the initial value.

The error correction and error detection takes place in the analogue domain.

In embodiments of the present invention, the benefits of hybrid (analogue and digital) and all digital synchronisation are combined without requiring a digital to analogue converter which is capable of dealing with small sized steps. The current analogue step size is tracked and in next step, the control is calculated with the aid of estimated step size.

Thus embodiments of the present invention may be particularly advantageous when used in automatic frequency control where the frequency of the down converted signals needs to be controlled to ensure that the desired signal is passed through the second filter. The control part is thus performed before the signal is sampled, that is converted from analogue to digital form.

Thus, in the acquisition mode, an attempt is made to control the error to be zero by the analogue circuit based on the estimated frequency error and an initial guess of the step size. The error is measured and the step estimation is updated. The control word is then calculated with the new estimate. This is continued until the error is small enough.

It should be appreciated that whilst embodiments of the present invention have been described in the context of a mobile station, embodiments of the invention may be incorporated in any suitable receiver. The receiver may be incorporated in the base station. The receiver can be used in contexts other than wireless cellular telecommunication networks and can be used wherever synchronisation is required. Embodiments of the present invention may even be used in non-wireless receivers where signals are received from a cable or the like.

In the preferred embodiment of the present invention, the synchronisation parameter which is controlled is frequency. In alternative embodiments of the invention, other parameters may be controlled such as timing, symbol synchronisation or the like.

In the embodiment shown, the down conversion to the base band frequency has been done in one step. In alternative embodiments, this down conversion make be done in two or more steps. In that case, the control provided by the digital signal processor is provided to any one of the mixers.

The preferred embodiment of the present invention has been described in the context of a frequency time division multiple access system. Embodiments of the present invention can be used with systems which use a frequency division multiple access system or a time division multiple access system or even a spread spectrum technique such as code division multiple access. Embodiments of the present invention may also be used with hybrids of two or more of these access techniques.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus comprising: a receiver for receiving a signal; and
    a synchroniser including a digital signal processor for processing the signal, wherein said synchroniser is configured to:
    provide a digital control signal, said control signal defining a plurality of different levels;
    control the level provided by successive ones of said control signals, successive ones of said control signal defining different values;
    convert said digital control signal into an analog control signal for controlling a mixing frequency; and
    estimate the difference between the levels of successive ones of said analog control signal, wherein said differences are used to estimate a step size between the successive analog control signal levels.

2. The apparatus of claim 1, wherein said providing, said controlling and said estimating are performed in a digital domain.

3. The apparatus of claim 2, wherein said providing, said controlling and said estimating are provided in the digital signal processor.

4. The apparatus of claim 1, wherein said providing is performed by a digital corrector.

5. The apparatus of claim 1, wherein a rough correction is provided by said control signal.

6. The apparatus of claim 5, wherein a rough correction is provided in an analog domain.

7. The apparatus of claim 5, wherein a finer correction is provided.

8. The apparatus of claim 7, wherein said finer correction is provided in a digital domain.

9. The apparatus of claim 1, wherein said estimating is performed by an estimator configured to determine that the difference between two successive levels has increased if a difference between the upper of said levels and an estimated level for an actual signal provides a signal at a higher level than a signal provided by a difference between a lower of said levels and an estimated level for the actual signal.

10. The apparatus of claim 1, wherein said estimating is performed by an estimator configured to determine that the difference between two successive levels has increased if a difference between the upper of said levels and an estimated level for an actual signal provides a signal at a higher level than a signal provided by a difference between a lower of said levels and an estimated level for the actual signal.

11. The apparatus of claim 1, wherein said estimating is performed by an estimator configured to determine that an actual signal has changed if a difference between the upper of said levels and an actual signal provides a signal at substantially the same level as a signal provided by a difference between a lower of said levels and the actual signal, said same level being different to a previous level for said actual signal.

12. The apparatus of claim 1, wherein said synchroniser is arranged to at least one of acquire and track frequency error.

13. The apparatus of claim 1, wherein said synchroniser is arranged to at least one of acquire and track timing error.

14. The apparatus of claim 1 embodied on a wireless receiver.

15. The apparatus of claim 1, wherein said providing means, said controlling means and said estimating means are in a digital domain.

16. The apparatus of claim 6, wherein a finer correction is provided.

17. The apparatus of claim 14, further comprising:
an antenna for receiving signals;
a first bandpass filter for filtering out unwanted signals;
a mixer for downconverting received signals to a baseband frequency;
a second bandpass filter for removing unwanted signals falling outside the bandwith of said second bandpass filter;
an analog to digital converter for converting signals received from said second bandpass filter from analog to digital form; and
a digital to analog converter for converting the signals received from said digital signal processor from digital to analog form.

18. The apparatus of claim 17, wherein said digital signal processor comprises:
a detector for measuring frequency errors and sending a digital word;
a filter for filtering said digital word output by said detector;
a step size estimator for estimating an actual step size of a frequency change provided by said digital to analog converter and providing said actual step size to analog correction; and
a digital automatic frequency control unit for controlling division of correction between analog and digital parts, performing an accurate correction so that a zero or close to zero error is achieved and compensating for the effect of an analog control for which a step size is estimated while a control word is changed.

19. A method comprising: receiving a signal on a receiver; and providing synchronization in the receiver of the received signal, further comprising:

providing a digital control signal, said control signal defining a plurality of different levels;
controlling the level provided by successive ones of said control signals, successive ones of said control signal defining different values;
converting the digital control signal into an analog control signal for controlling a mixing frequency; and
estimating the difference between the levels of successive ones of said analog control signal, wherein said differences are used to estimate a step size between the successive analog control signal levels.

20. A computer program product embodied on a computer-readable medium comprising instructions that when executed result in operations for providing synchronization in a receiver, comprising:
providing a digital control signal, said control signal defining a plurality of different levels;
controlling the level provided by successive ones of said control signals, successive ones of said control signal defining different values;
converting the digital control signal into an analog control signal for controlling a mixing frequency; and
estimating the difference between the levels of successive ones of said analog control signal, wherein said differences are used to estimate a step size between the successive analog control signal levels.

21. A synchronizer for use in a receiver which receives signals, said synchronizer comprising:
means for providing a digital control signal, said control signal defining a plurality of different levels;
means for controlling the level provided by successive ones of said control signals, successive ones of said control signal defining different values;
means for converting said digital control signal into an analog control signal for controlling a mixing frequency; and
means for estimating the difference between the levels of successive ones of said analog control signal, wherein said differences are used to estimate a step size between the successive analog control signal levels.

22. A synchronizer for use in a receiver comprising:
a digital to analogue convertor; and
a digital signal processor having a detector configured to provide a digital control signal, said control signal defining a plurality of different levels, wherein the level provided by successive ones of said control signals is controlled so that successive ones of said control signal defining different values, wherein said digital to analogue converter is configured to convert for estimating the difference between the levels of successive ones of said analog control signal and send digital signal processor has a step size estimator configured to estimate the differences between the levels of successive ones of said analog control signal, wherein said differences are used to estimate a step size between the successive analog control signal levels.

* * * * *